United States Patent
Tseng et al.

(10) Patent No.: US 11,247,122 B2
(45) Date of Patent: Feb. 15, 2022

(54) GAMING DEVICE AND GAMING DEVICE RECOGNITION METHOD

(71) Applicants: Yu-Hao Tseng, Taipei (TW);
Kun-Hsuan Chang, Taipei (TW);
Jung-Ming Hung, Taipei (TW);
Che-Wei Liang, Taipei (TW)

(72) Inventors: Yu-Hao Tseng, Taipei (TW);
Kun-Hsuan Chang, Taipei (TW);
Jung-Ming Hung, Taipei (TW);
Che-Wei Liang, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 151 days.

(21) Appl. No.: 16/593,947

(22) Filed: Oct. 4, 2019

(65) Prior Publication Data
US 2020/0282304 A1 Sep. 10, 2020

(30) Foreign Application Priority Data
Mar. 4, 2019 (TW) ................. 108107138

(51) Int. Cl.
*A63F 13/213* (2014.01)
*G06K 9/46* (2006.01)
(Continued)

(52) U.S. Cl.
CPC ............ *A63F 13/213* (2014.09); *A63F 13/23* (2014.09); *A63F 13/80* (2014.09);
(Continued)

(58) Field of Classification Search
CPC .................... A63F 13/213; A63F 13/80; A63F 2001/0475; A63F 2009/2435;
(Continued)

(56) References Cited
U.S. PATENT DOCUMENTS 5,722,893 A * 3/1998 Hill ........................... A63F 1/14
273/149 R
7,946,491 B2 * 5/2011 Burian ............... G06K 7/10722
235/462.07
(Continued)

FOREIGN PATENT DOCUMENTS

TW 200827006 7/2008
TW M438302 2/2012

OTHER PUBLICATIONS

Office Action of Taiwan Counterpart Application, dated Mar. 11, 2020, p. 1-p. 11.

*Primary Examiner* — William H McCulloch, Jr.
(74) *Attorney, Agent, or Firm* — JCIPRNET

(57) ABSTRACT

A gaming device and a gaming device recognition method are provided. The method is applicable to an electronic device having an image capturing device, a storage device and a processor, and includes following steps. A captured image of the gaming device is captured by the image capturing device, wherein the gaming device includes a recognition code having anchor grids and recognition grids. Then, a first image is generated by performing image processing on the captured image, and the anchor grids of the first image are recognized. Next, a recognition template is decided according to the anchor grids, wherein the recognition template including code grids and grid numbers of each code grid. Finally, a filled status of each code grid is determined according to the first image, and a tag code corresponding to the recognition code is generated according to the filled status of each code grid and the grid numbers.

34 Claims, 8 Drawing Sheets

(51) Int. Cl.
*G06K 9/32* (2006.01)
*A63F 13/80* (2014.01)
*G06K 7/10* (2006.01)
*A63F 13/23* (2014.01)

(52) U.S. Cl.
CPC ....... *G06K 7/10722* (2013.01); *G06K 9/3233* (2013.01); *G06K 9/4604* (2013.01); *A63F 2300/1025* (2013.01); *A63F 2300/1087* (2013.01); *A63F 2300/80* (2013.01)

(58) Field of Classification Search
CPC ......... A63F 2300/1087; A63F 2300/80; G06K 7/10722; G06K 9/3233; G06K 9/4604
See application file for complete search history.

(56) References Cited

U.S. PATENT DOCUMENTS

| | | | | |
|---|---|---|---|---|
| 8,419,535 B2 * | 4/2013 | Miller | ...................... | A63F 1/12 463/31 |
| 8,545,328 B2 * | 10/2013 | Miller | ................. | G07F 17/3293 463/42 |
| 8,556,266 B2 * | 10/2013 | Yoshida | .................... | A63F 1/02 273/293 |
| 8,758,111 B2 * | 6/2014 | Lutnick | .................. | G07F 17/34 463/16 |
| 8,932,124 B2 * | 1/2015 | Lutnick | ............... | G07F 17/3276 463/16 |
| 9,254,435 B2 * | 2/2016 | Miller | ....................... | A63F 1/14 |
| 9,595,169 B2 * | 3/2017 | Lutnick | ............... | G07F 17/3276 |
| 9,886,766 B2 * | 2/2018 | Madineni | .................. | G06T 7/11 |
| 10,551,967 B2 * | 2/2020 | Ha | ......................... | G06F 3/044 |
| 2008/0029602 A1 * | 2/2008 | Burian | ............... | G06K 7/10722 235/462.09 |
| 2010/0276887 A1 * | 11/2010 | Yoshida | .................... | A63F 1/04 273/293 |
| 2010/0311489 A1 * | 12/2010 | Miller | ..................... | G07F 17/32 463/16 |
| 2010/0311490 A1 * | 12/2010 | Miller | ....................... | A63F 1/18 463/16 |
| 2011/0049234 A1 * | 3/2011 | Yoshida | ................ | G06F 3/0421 235/380 |
| 2015/0049946 A1 * | 2/2015 | Madineni | .................. | G06T 7/11 382/173 |
| 2016/0045816 A1 * | 2/2016 | Ogilvie | ..................... | A63F 1/02 273/295 |
| 2019/0278457 A1 * | 9/2019 | Ha | ..................... | G06K 19/0672 |
| 2020/0282304 A1 * | 9/2020 | Tseng | ................. | G06K 7/10722 |
| 2020/0282305 A1 * | 9/2020 | Liang | .................... | A63F 13/235 |

* cited by examiner

GAMING DEVICE AND GAMING DEVICE RECOGNITION METHOD

CROSS-REFERENCE TO RELATED APPLICATION

This application claims the priority benefit of Taiwan application serial no. 108107138, filed on Mar. 4, 2019. The entirety of the above-mentioned patent application is hereby incorporated by reference herein and made a part of this specification.

BACKGROUND

Field of the Invention

The invention relates to a gaming device and an image recognition technique and more particularly, to a gaming device and a gaming device recognition method used in a card game.

Description of Related Art

Generally, a card game has to be played by a plurality of players. For example, a mahjong game has to be played by four people by the same mahjong table. However, in modern busy life, it is not easy to gather a plurality of players to play the card game together, and a condition of "three players looking for one more player" may probably often occur to the mahjong game.

Along with the progress in technologies, many on-line card games have been developed. Players are gathered and grouped through the Internet, and these on-line card games can satisfy players' demands anytime, anywhere. However, even though players can play the games in an on-line game manner anytime, anywhere, they can operate virtual cards only by operations via a touch screen or a mouse, which lacks the enjoyment from interactions with actual cards, such as draw or play cards.

SUMMARY

Accordingly, the invention provides a gaming device and a gaming device recognition method capable of being applied in a computer card game.

The invention provides a gaming device recognition method applicable to an electronic device having an image capturing device, a storage device and a processor. The gaming device recognition method includes the following steps. At least one captured image of a gaming device is captured by the image capturing device, wherein the gaming device includes a recognition code having anchor grids and recognition grids. A first image is generated by performing image processing on the captured image. The anchor grids in the first image are recognized. A recognition template decided according to the anchor grids, wherein the recognition template includes code grids and a grid number corresponding to each of the code grids. A filled status of each of the code grids is determined according to the first image, and a tag code corresponding to the recognition code is generated according to the filled status and the grid number.

The invention provides a gaming device applicable to a card game. The gaming device includes a recognition code and a display panel. The recognition code has anchor grids and recognition grids. The recognition code corresponds to a tag code, and the tag code corresponds to a face of the card game. The display panel is configured to display a game screen corresponding to the face. The display panel corresponds to a first region of a surface of the gaming device, the recognition code corresponds to a second region of the surface, and the first region and the second region does not overlap with each other.

The invention provides a gaming device recognition method applicable to an electronic device having an image capturing device, a storage device and a processor. The gaming device recognition method includes the following steps. A plurality of first infrared images of a gaming device are captured by the image capturing device. A first image is generated by performing image processing on the first infrared images. Whether a plurality of anchor grids exist in the first image is detected and determined, and if the anchor grids exist, positions of a plurality of code grids in the first image are detected and defined.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

A gaming device provided by the embodiments of the invention is applicable to poker, mahjong or other card games played by one to multiple people. A gaming device recognition method is used to recognize a recognition code on the gaming device, and the recognition code on each gaming device is different from one another. The recognition codes of the gaming devices correspond to faces in a card game and may be used in the card game.

Figure 1:
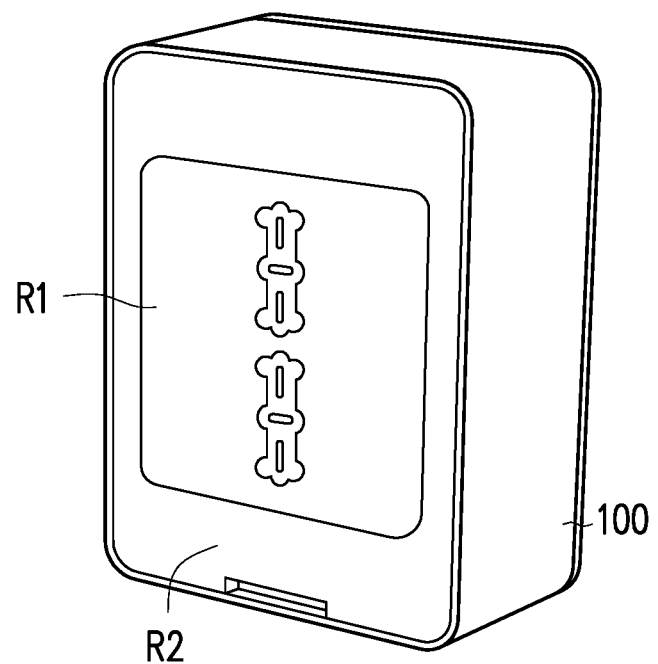
FIG. 1 is a schematic diagram illustrating an appearance of a gaming device according to an embodiment of the invention.

FIG. 1 is a schematic diagram illustrating an appearance of a gaming device according to an embodiment of the invention. Referring to FIG. 1, a gaming device 100 is applicable for a card game. In some embodiments, the gaming device 100 is, for example, a game card having an appearance of a mahjong tile, but the invention is not limited thereto. One of surfaces of the gaming device 100 includes a first region R1 (e.g., a central region) and a second region R2 (e.g., a peripheral region surrounding the central region), and the first region R1 and the second region R2 do not overlap with each other. In an embodiment, the gaming device 100 includes a recognition code and a display panel, the recognition code has anchor grids and recognition grids. The recognition code corresponds to a tag code, and the tag code corresponds to a face of a game card in a card game. The display panel is used to display a game screen corresponding to the corresponding face of the tag code. The display panel corresponds to the first region R1 of the gaming device 100, and the recognition code corresponds to the second region R2. In other words, the display panel and the recognition code of the gaming device 100 does not overlap nor shield with each other.

Figure 2:
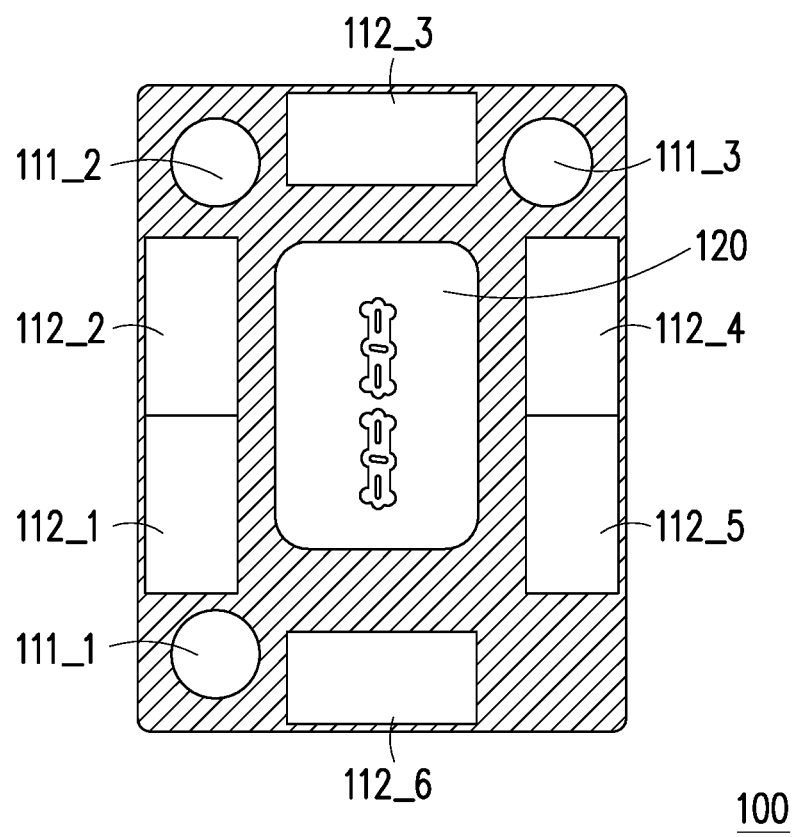
FIG. 2 illustrates an example of a surface of the gaming device according to an embodiment of the invention.
Figure 3:
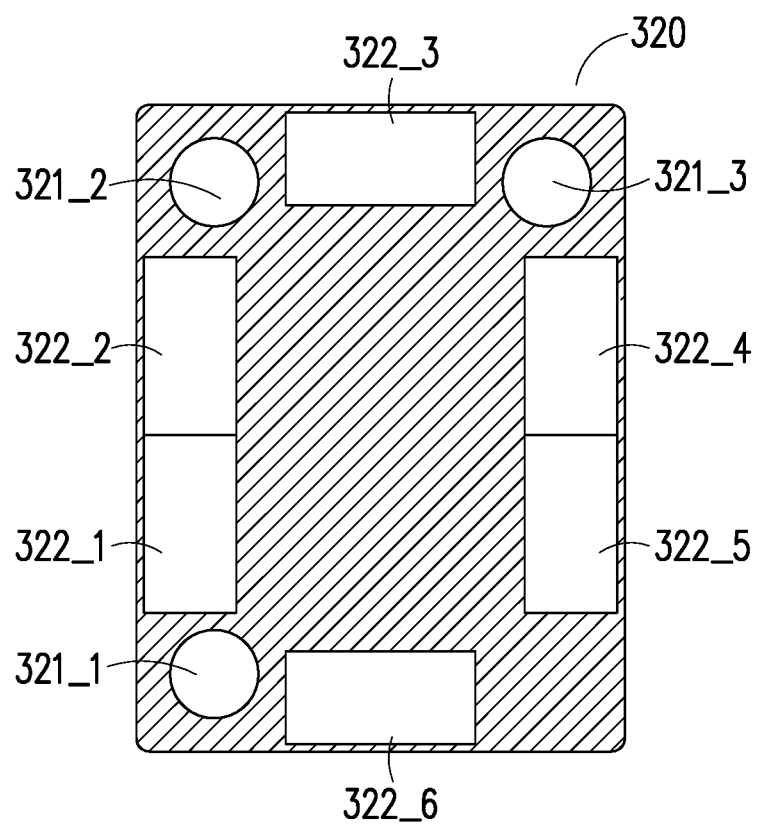
FIG. 3 illustrates an example of a recognition template according to an embodiment of the invention.

FIG. 2 illustrates an example of a surface of the gaming device according to an embodiment of the invention. FIG. 3 illustrates an example of a recognition template according to an embodiment of the invention. Referring to FIG. 2 first, in the present embodiment, the gaming device 100 includes a recognition code and a display panel 120. The recognition code includes a plurality of anchor grids 111_1 to 111_3 illustrated in FIG. 2 and a plurality of recognition grids 112_1 to 112_6 in combinations. In detail, the recognition code 110 may include one or more combinations of the recognition grids 112_1 to 112_6. For example, the recognition grids 112_1 to 112_3, the recognition grids 112_1 and 112_3 or different combinations of the recognition grids may be printed on the gaming device 100. These recognition grids 112_1 to 112_6 in different combinations may correspond to different faces in game cards.

In an embodiment, the recognition code 110 corresponds to a predetermined recognition template, and positions and numbers of the anchor grids 111_1 to 111_3 and the recognition grids 112_1 to 112_6 are predetermined by the recognition template. The recognition template, for example, corresponds to a preset model. Referring to FIG. 2 and FIG. 3 simultaneously, a preset model 320 illustrated in FIG. 3 includes anchor grids 321_1 to 321 to 3 and code grids 322_1 to 322_6. The code grids 322_1 to 322_6 respectively correspond to grid numbers 0 to 5. Positions of the anchor grids 111_1 to 111_3 of the recognition code 110 correspond to positions of the anchor grids 321_1 to 321_3 of the preset model 320, and positions of the recognition grids 112_1 to 112_6 of the recognition code 110 correspond to positions of the code grids 322_1 to 322_6 of the preset model 320. In this case, the numbers and the positions of the anchor grids, the recognition grids and the code grids illustrated in FIG. 2 and FIG. 3 are merely used as examples and are not limited in the invention.

In an embodiment, the recognition code 110 is invisible under visible light. For instance, the recognition code 110 may be printed on a surface of the gaming device 100 by using an invisible ink (e.g., an infrared ink). Accordingly, a user, when playing a game, does not see the recognition code 110 on the gaming device 100. In an embodiment, the gaming device 100 further includes a filter (e.g., an infrared filter) covering the recognition code 110.

The display panel 120 is used to display a game screen corresponding to a face. The display panel 120 is a display screen, for example, an electronic paper or a liquid-crystal display (LCD), a light-emitting diode (LED) or an organic light-emitting diode (OLED), but the invention is not limited thereto. For instance, if the gaming device 100 is used in a mahjong game, the display panel 120 may display a mahjong face, for example, a mahjong pattern as illustrated in FIG. 2. If the gaming device 100 is used in a poker game, the display panel 120 may display a poker pattern including a suit (e.g., spade, heart, diamond or club) and a number (e.g., A, 1, 2 . . . or K).

Figure 4:
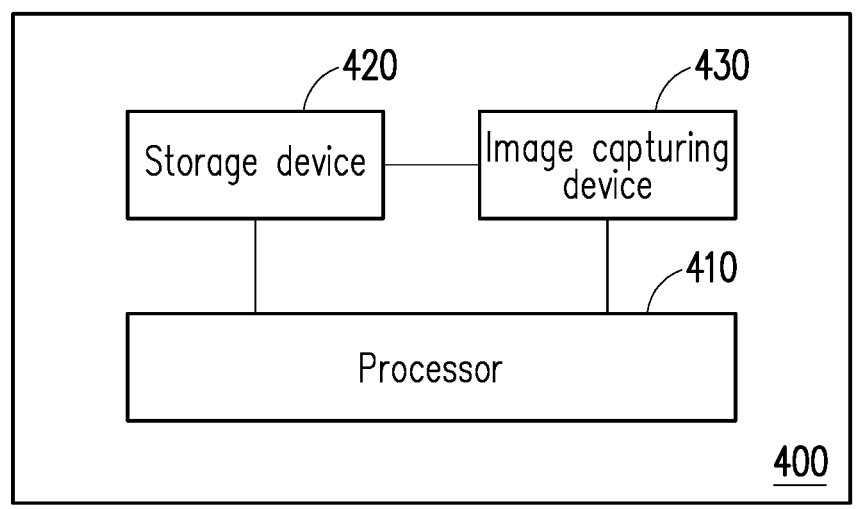
FIG. 4 is a block diagram illustrating an electronic device according to an embodiment of the invention.

The invention further provides a method of recognizing the recognition code 110 of the gaming device 100, and the method is applicable to an electronic device. FIG. 4 is a block diagram illustrating an electronic device according to an embodiment of the invention. An electronic device 400 includes a processor 410, a storage device 420 and an image capturing device 430. In another embodiment, the electronic device 400 may include a recognition region (not shown).

Referring to FIG. 4, the processor 410 is coupled to the storage device 420 and the image capturing device 430. The processor 410 is used to perform the method of recognizing the recognition code 110 of the gaming device 100 provided by the invention. The processor 410 is, for example, any type of central processing unit (CPU, e.g., dual-core, a quad-core or an eight-core CPU), a system-on-chip (SOC), an application processor, a media processor, a microprocessor, a digital signal processor, a programmable controller, application specific integrated circuits (ASIC), a programmable logic device (PLD), other similar devices or a combination of the aforementioned devices, which is not limited in the invention.

The storage device 420 stores the preset model 320. The storage device 420 is, for example, any fixed or movable random access memory (RAM), read-only memory (ROM), a flash memory, a hard disk, other similar devices or a combination of the aforementioned devices and is used to record a plurality of instructions which may be executed by the processor 410. These instructions may be loaded into the processor 410.

The image capturing device 430 is used to capture an image of the gaming device 100. Especially, the image capturing device 430 is capable of capturing the recognition code 110 of the gaming device 100. In an embodiment, when the recognition code 110 is printed by using the invisible ink (e.g., the infrared ink), the image capturing device 430 emits invisible light (e.g., infrared light) toward the gaming device 100. As such, the image capturing device 430 may capture reflected light of the invisible light which is reflected by the gaming device 100 to obtain the image of the gaming device 100, which includes the recognition code 110 of the gaming device 100. In this case, even though the recognition code 110 printed on the gaming device 100 is invisible under visible light, but the image capturing device 430 is still capable of capturing the recognition code 110.

Figure 5:
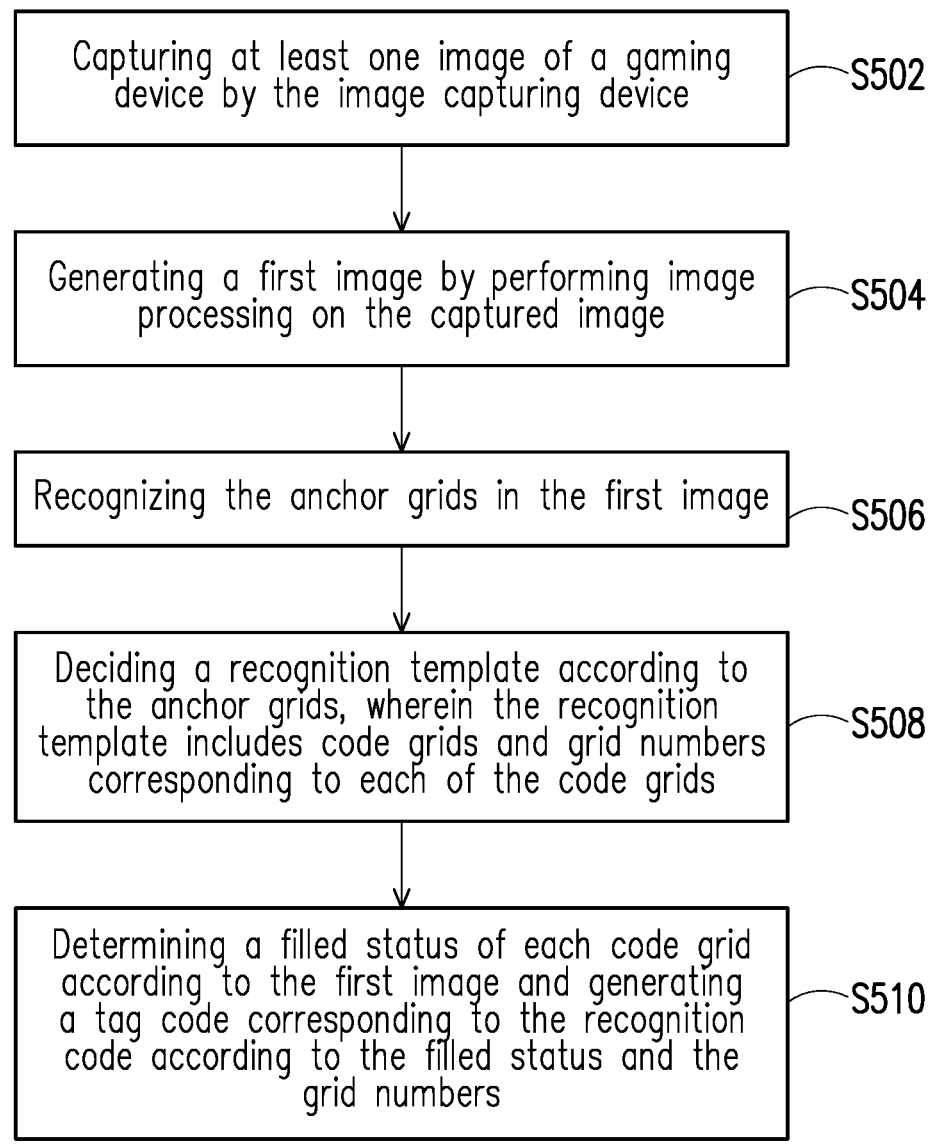
FIG. 5 is a flowchart illustrating a gaming device recognition method according to an embodiment of the invention.
Figure 6:
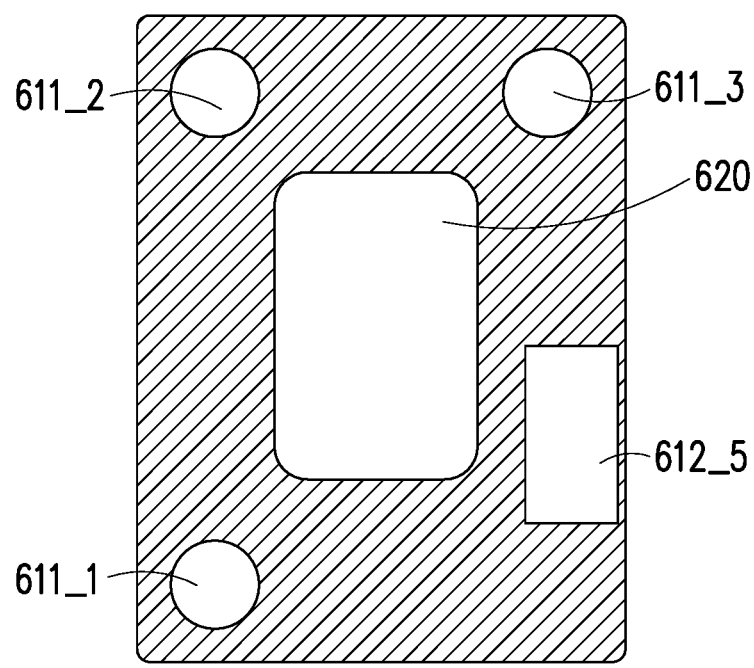
FIG. 6 illustrates an example of a recognition code of the gaming device according to an embodiment of the invention.

FIG. 5 is a flowchart illustrating a gaming device recognition method according to an embodiment of the invention. FIG. 6 illustrates an example of a recognition code of the gaming device according to an embodiment of the invention. Referring to FIG. 3 through FIG. 6 simultaneously, the method of the present embodiment is configured and performed by the processor 410, and the method of the present embodiment is applicable for recognizing a recognition code of a gaming device 600. The gaming device 600 includes a recognition code and a display panel 620, and the recognition code includes anchor grids 611_1 to 611_3 and a recognition grid 612_5. Detailed steps of the gaming device recognition method of the present embodiment will be described with the recognition code illustrated in FIG. 6 and the preset model 320 illustrated in FIG. 3.

First, the processor 410 captures an image of the gaming device 600 via the image capturing device 430 (step S502). The gaming device 600 includes the recognition code having the anchor grids and the recognition grid. In an embodiment, the electronic device 400 includes a recognition region (not shown). Meanwhile, the processor 410 controls the image capturing device 430 to capture the image of the gaming device 600 in the recognition region.

Then, the processor 410 performs image processing on the captured image to generate a first image (step S504). The image of the gaming device 600 which is captured by the image capturing device 430, after the image processing is performed thereon, generates the first image which may be easily recognized subsequently. In an embodiment, a method of the image processing may include, for example, image sharpening, image binarization and/or dilation of morphological operation.

In another embodiment, since the recognition code is printed on the gaming device 600 by using an infrared ink, the image capturing device 430 may capture the recognition code only by emitting infrared light to obtain an infrared image. When the image capturing device 430 captures the infrared image of the gaming device 600, blurs and instability may be probably incurred to the image captured by the image capturing device 430 due to the infrared light captured and emitted by the image capturing device 430 being reflected by an infrared filter, and as a result, incompleteness may be incurred to data contained in the first image generated after the image processing being performed thereon. Thus, the image capturing device 430 may capture a plurality of images (e.g., a plurality of infrared images) of the gaming device 600, and the processor 410 may perform the image processing on each captured image. Then, the processor 410 calculates a probability of pixel dots having same coordinates existing in each captured image on which the image processing has been performed to decide the first image. The number for capturing the images of the gaming device 600 via the image capturing device 430 is predetermined.

For instance, the processor 410 captures the images of the gaming device 600 via the image capturing device 430, and the processor 410 performs the image processing on the captured images, for example, by enhancing edge characteristics of the images by means of image sharpening, then adjusting grayscale values of the images by means of image binarization, and finally, removing noise from the images by means of dilation of morphological operation. After the image processing is performed on each image, the processor 410 extracts regions of interest (ROIs) in the images on which the image processing has been performed. When the first ROI images are accumulated to reach a predetermined number, the processor 410 obtains a second ROI image by superimposing the predetermined number of the first ROI images and dividing it by a sampling number. Then, the processor 410 generates the first image by performing image binarization on the second ROI images. In an embodiment, the sampling number is less than the predetermined number, and the sampling number is greater than ½ of the predetermined number.

Figure 7:
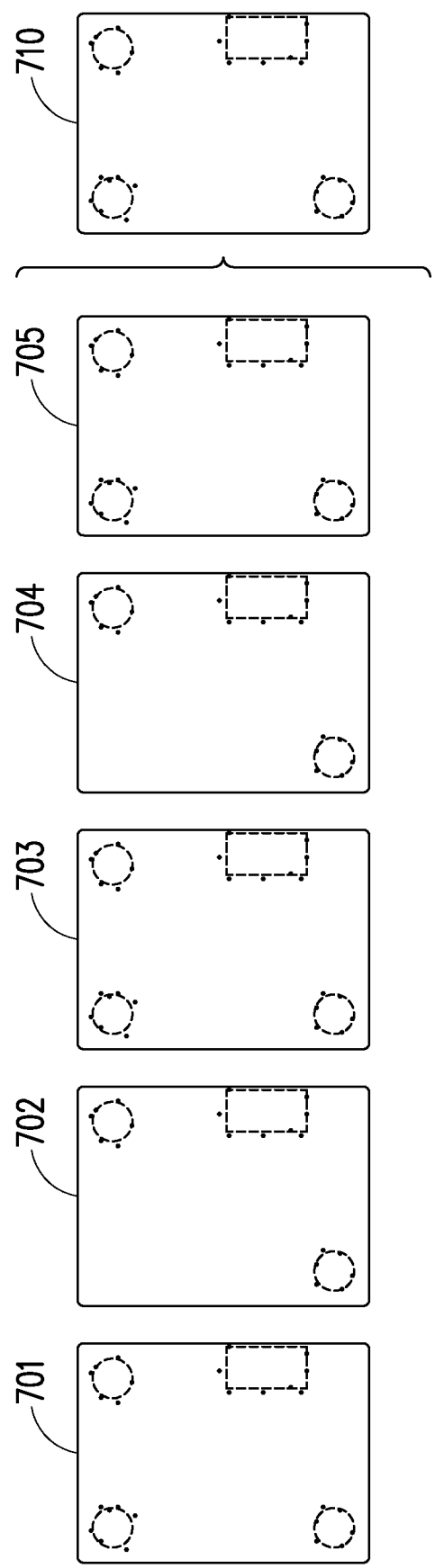
FIG. 7 is a schematic diagram of calculating a captured image according to an embodiment of the invention.

FIG. 7 is a schematic diagram of calculating a captured image according to an embodiment of the invention. Taking the number for capturing the images being 5 as an example, after the image processing are performed on the capturing 5 images of the gaming device 600 captured by the image capturing device 430 and the ROI (e.g., a region other than the display panel) of each image are extracted, ROI images 701 to 705 as illustrated in FIG. 7 can be obtained. In this case, the processor 410 calculates a probability of pixel dots located at the same coordinates existing in each of the ROI images 701 to 705 to decide a first image. To be detailed, the processor 410 determines whether the pixel dots located the same coordinates in the ROI images 701 to 705 exist, for example, determines whether the pixel dots exist according to a grayscale value of each of the pixel dots. Then, the processor 410 divides the number of the pixel dots determined as existing by a sampling number to calculate the probability of occurrence of the pixel dots of each coordinate. In an embodiment, taking the sampling number being 3 as an example, the processor 410 determines 5 pixel dots located at the same coordinates in each of the ROI images 701 to 705, and if 3 pixel dots exist among the 5 pixel dots (e.g., the pixel dots in the ROI images 701 to 705), the pixel dots having the coordinates are determined as existing. After each coordinate of the ROI images 701 to 705 is sampled and calculated in the aforementioned manner, a first image 710 as illustrated in FIG. 7 may be obtained, wherein the sampling number is preset.

Then, the processor 410 recognizes anchor grids in the first image (step S506). The processor 410 detects and determines whether a plurality of anchor grids exist in the first image. If the anchor grids exist, positions of a plurality of code grids in the first image are detected and defined. In an embodiment, as the preset model 320 has three anchor grids, the processor 410 recognizes and confirms that the first image has three anchor grids and respectively defines the three anchor grids as a first anchor grid, a second anchor grid and a third anchor grid. In the step of determining whether the anchor grids exist in the first image, the processor 410 detects a plurality of first contour coordinate points in the first image, and the processor 410 obtains a plurality of virtual objects according to the detected first contour coordinate points by using a polygonal approximation method. Then, the processor 410 generates rectangular objects corresponding to the virtual objects according to a plurality of second contour coordinate points corresponding to the obtained virtual objects and determines whether each virtual object belongs to the anchor grid according to an area of each rectangular object.

Figure 8A:
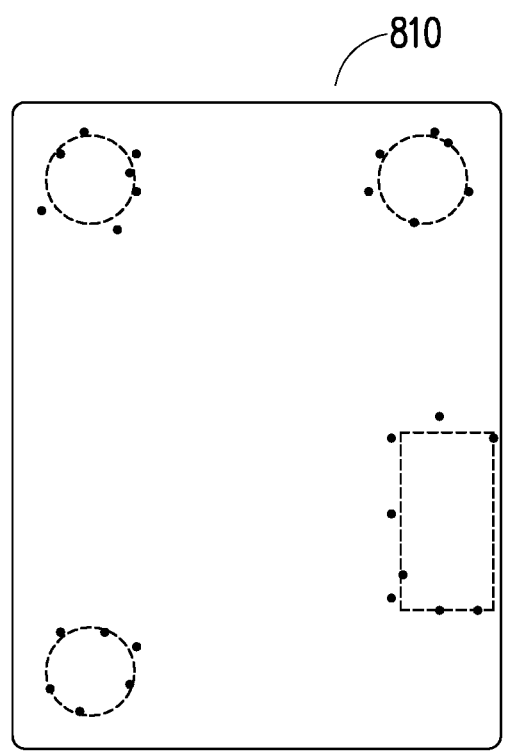
FIG. 8A through FIG. 8C are schematic diagrams illustrating the anchor grids according to an embodiment of the invention.
Figure 8B:
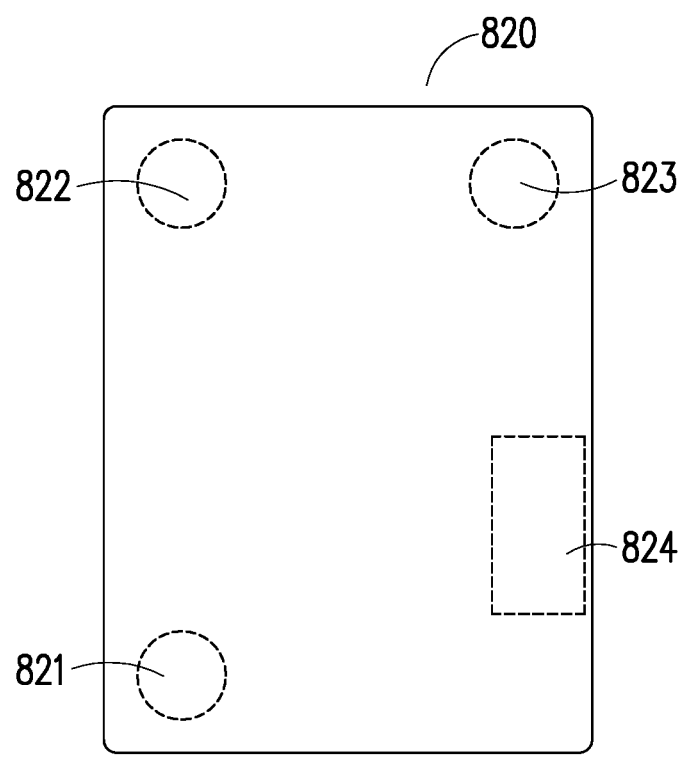
Figure 8C:
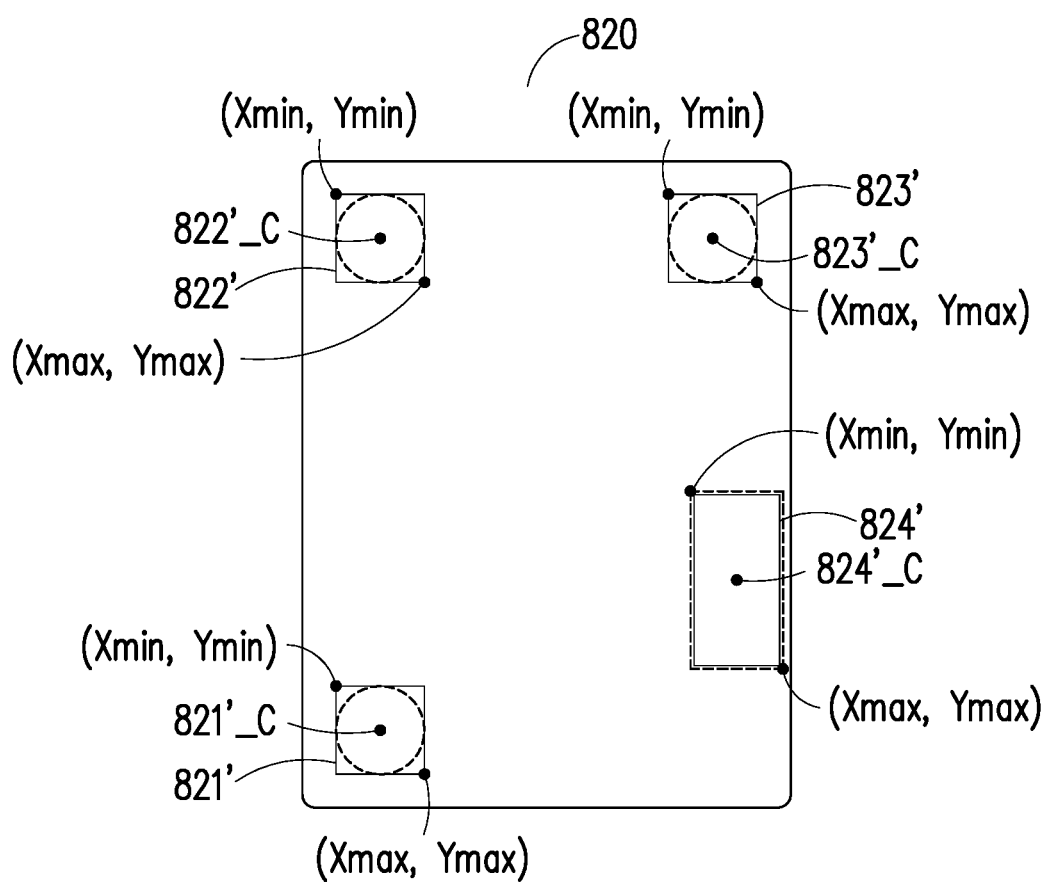

FIG. 8A through FIG. 8C are schematic diagrams illustrating the anchor grids according to an embodiment of the invention. In detail, referring to FIG. 8A first, the processor 410 detects a plurality of first contour coordinate point in a first image 81 (e.g., pixel dots in the first image 810), for example, M first contour coordinate points are detected. Then, referring to FIG. 8B, the processor 410 filters the M first contour coordinate points in the first image 810 by using a polygonal approximation method and obtain N filtered contour coordinate points (e.g., pixel dots in a first image 820), wherein N is less than or equal to M. Then, the processor 410 serves similar contour coordinate points among the N contour coordinate points as virtual objects. In the present embodiment, the processor 410 obtains virtual objects 821 to 824.

Further referring to FIG. 8C, in each of the virtual objects 821 to 824, the processor 410 generates the second contour coordinate points corresponding to the virtual objects 821 to 824, wherein the second contour coordinate points of each virtual object include two second contour coordinate points having minimum horizontal and minimum vertical coordinate values A (Xmin, Ymin) and maximum horizontal and maximum vertical coordinate values B (Xmax, Ymax). Then, the processor 410 respectively defines rectangular objects 821' to 824' respectively corresponding to the virtual objects 821 to 824 according to the second contour coordinate points A (Xmin, Ymin) and B (Xmax, Ymax) of each of the virtual objects 821 to 824. The processor 410 calculates center points 821'_C to 824'_C of the rectangular objects 821' to 824' according to the second contour coordinate points A (Xmin, Ymin) and B (Xmax, Ymax) and uses the center points 821'_C to 824'_C to respectively represent the virtual objects 821 to 824. Finally, the processor 410 calculates an area of each of the rectangular objects 821' to 824' and determines whether the virtual objects 821 to 824 respectively corresponding to the rectangular objects 821' to 824' belong to the anchor grids according to the area of each of the rectangular objects 821' to 824'.

In an embodiment, if the area of the rectangular object is less than a first threshold value, the virtual objects corresponding to the rectangular objects belong to the anchor grids. The first threshold value is preset. In the present embodiment, the area of each of the rectangular object 821' to 823' is less than the first threshold value, it is determined that the virtual objects 821 to 823 belong to the anchor grids. On the other hand, the area of the rectangular object 824' is greater than the first threshold value, and it is determined that the virtual object 824 does not belong to the anchor grid.

Then, the processor 410 decides a recognition template according to the anchor grids, wherein the recognition template includes the code grids and a grid number corresponding to each code grid (step S508). The processor 410 determines a direction of the recognition template according to the anchor grids. Referring to FIG. 8A to FIG. 8C, after the virtual objects 821 to 823 of the first image 820 are determined as belonging to the anchor grids in step S506, the processor 410 determines the direction of the recognition template according to the center points 821'_C to 823'_C corresponding to the virtual objects 821 to 823 and generates the recognition template.

To be detailed, the processor 410 calculates inner products according to the three center points 821'_C to 823'_C and obtains a plurality of included angles, and among them, a maximum included angle is 90 degrees. Then, the processor 410 defines the virtual object 821 corresponding to a minimum included angle as the first anchor grid, defines the virtual object 822 corresponding to a maximum included angle as the second anchor grid and defines the virtual object 823 corresponding to an intermediate included angle as the third anchor grid. Then, the processor 410 generates the recognition template according to the first anchor grid, the second anchor grid and the third anchor grid. The recognition template generated by the processor 410 includes a plurality of code grids, and these code grids are configured among the first anchor grid, the second anchor grid and the third anchor grid. In addition, the processor 410 defines positions of the code grids in the recognition template. Then, the processor 410 further generates a plurality of serial numbers according to the first anchor grid, the second anchor grid and the third anchor grid and corresponds the generated serial numbers to the code grids in the recognition template.

In another embodiment, the processor 410 reads a preset model and corresponds each code grid and the position of each code grid to the preset model to define the positions of the code grids. For instance, referring to FIG. 3, FIG. 8A and FIG. 8C simultaneously, the preset model obtained by the processor 410 may be, for example, the preset model 320 illustrated in FIG. 3. The processor 410, after calculating the inner products according to the three center points 821'_C to 823'_C, defines the virtual object 821 corresponding to the center point 821'_C of the minimum included angle as the first anchor grid and corresponds the first anchor grid to the anchor grid 321_1 of the preset model 320. The processor 410 defines the virtual object 822 corresponding to the center point 822'_C of the maximum included angle as the second anchor grid and corresponds the second anchor grid to the anchor grid 321_2. In addition, the processor 410 defines the virtual object 823 corresponding to the center point 823'_C of the intermediate included angle as the third anchor grid and corresponds the third anchor grid to the anchor grid 321_3. Then, the processor 410 overlaps the preset model 320 and the first image 810 according to the anchor grids 321_1 to 321_3 and the positions of the first anchor grid, the second anchor grid and the third anchor grid to respectively correspond the code grids in the recognition template corresponding to the first anchor grid, the second anchor grid and the third anchor grid and the positions of the code grids to each code grid in the preset model 320.

In another embodiment, as a user may hold the gaming device in a vertical or a horizontal manner when taking the gaming device, the gaming device recognition method provided by the invention may also generate a vertical or a horizontal recognition template according to the included angles between the anchor grids during the process of deciding the recognition template according to the anchor grids. To be detailed, the processor 410 defines a triangular pattern according to the first anchor grid, the second anchor grid and the third anchor grid and accordingly, generates a recognition template. Specifically, in the step of generating the recognition template according to the triangular pattern, the processor 410 first determines whether the triangular pattern defined according to the first anchor grid, the second anchor grid and the third anchor grid is vertical or horizontal. If the triangular pattern is vertical, whether the triangular pattern is needed to be rotated is further determined. If the triangular pattern is not needed to be rotated, a vertical recognition template is generated directly according to the triangular pattern. If the triangular pattern is needed to be rotated, the triangular pattern is first rotated by 180 degrees to accordingly generate the vertical recognition template. On the other hand, if the triangular pattern is horizontal, whether the triangular pattern is needed to be rotated is further determined. If the triangular pattern is not needed to be rotated, a horizontal recognition template is generated directly according to the triangular pattern. If the triangular pattern is needed to be rotated, the triangular pattern is first rotated by 180 degrees to accordingly generate the horizontal recognition template.

Finally, the processor 410 determines a filled status of each code grid according to the first image and generates a tag code corresponding to the recognition code according to the filled status and the grid number (step S510). The processor 410 determines whether the first image has third contour coordinate points at the same coordinate positions corresponding to the code grids. If the first image has the third contour coordinate points, it is determined that each code grids is presented in a filled status, and if the first image does not have the third contour coordinate points, it is determined that each code grid is presented in an unfilled status. In addition, the processor 410 calculates the tag code according to the filled status of each code grid by using a binary system. When the code grid is presented in the filled status, the code grid corresponds to the bit 1 of the binary system, and when the code grid is presented in the unfilled status, the code grid corresponds to the bit 0 of the binary system. The tag code is generated by sorting the bits corresponding to the code grids according to an order of the grid numbers corresponding to the code grids. In an embodiment, the processor 410 converts the tag code into a decimal value.

Referring to FIG. 3, FIG. 8A and FIG. 8C simultaneously, following step S508, the preset model 320 is overlapped with the first image 810 according to the anchor grids 321_1 to 321_3 of the preset model 320 and the positions of the first anchor grid, the second anchor grid and the third anchor grid of the first image 820. In this circumstance, the processor 410 determines whether the third contour coordinate points exist at the same coordinate positions corresponding to the code grids 322_1 to 322_6 in the first image 810. In the present embodiment, the third contour coordinate points (pixel dots in FIG. 8A) exist at the position corresponding to the position of the code grid 322_5 in the first image 810.

In the present embodiment, as the third contour coordinate points exist at the coordinate positions corresponding to the code grid 322_5 and the first image 810, the processor 410 determines that the code grid 322_5 is presented in the filled status. In this circumstance, the processor 410 determines that the code grid 322_5 corresponds to the bit 1 of the binary system. On the other hand, as no third contour coordinate points exist at the positions corresponding to the code grids 322_1 to 322_4 and 322_6 and the first image 810, the processor 410 determines that the code grids 322_1 to 322_4 and 322_6 are presented in the unfilled status. In this circumstance, the processor 410 determines that the code grids 322_1 to 322_4, 322_6 correspond to the nit 0 of the binary system. After determining the binary bit corresponding to each code grids, the processor 410 sorts and order of the binary bits corresponding to the code grids according to the grid numbers corresponding to the code grids. In the present embodiment, the grid number corresponding to the code grid 322_1 is 0, the grid number corresponding to the code grid 322_2 is 1, the grid number corresponding to the code grid 322_3 is 2, the grid number corresponding to the code grid 322_4 is 3, the grid number corresponding to the code grid 322_5 is 4, and the grid number corresponding to the code grid 322_6 is 5. The processor 410 generates a binary tag code 000010 corresponding to the recognition code of the gaming device 600 according to the filled statuses of the code grids 322_1 to 322_6 and the grid numbers 0 to 5 corresponding to the code grids 322_1 to 322_6. In an embodiment, the processor 410 converts the tag code 000010 in to a decimal value of 2.

The recognized tag code respectively corresponds to each face of the card game. In the present embodiment, the preset model 320 corresponding to the recognition code 610 has 6 code grids, while the preset model 320 may correspond to 6 binary bits. Thus, in the present embodiment, the preset model 320 may correspondingly generate 64 different combinations for the recognition code. In another embodiment, the number of the code grids that may be included in the recognition template may be increased or reduced, the positions of the code grids may also be configured as different positions, which are not limited in the invention.

In another embodiment of the invention, the electronic device 400 further includes a communication device (not shown) coupled to the processor 410. The communication device is used to transmit or receive data in a wireless communication manner. In the present embodiment, the communication device may have a wireless communication module and support one or a combination of a global system for mobile communication (GSM) system, a personal handy-phone system (PHS), a code division multiple access (CDMA) system, a wireless fidelity (Wi-Fi) system, a worldwide interoperability for microwave access (WiMAX) system, a third-generation (3G) wireless communication technique, a fourth-generation (4G) wireless communication technique, a fifth-generation (5G) wireless communication technique, a long term evolution (LTE) communication technique, an infrared transmission technique, and a Bluetooth (BT) communication technique, but the invention is not limited thereto.

Following step S510, after generating the tag code, the processor 410 decides which face of the card game the tag code corresponds to, wherein the face corresponds to a game screen. Then, the processor 410 transmits the game screen corresponding to the face to the gaming device via the communication device. To be detailed, the gaming device provided by the invention is used in the card game. When the game starts, the processor 410 generates corresponding relationships between a plurality of tag codes and a plurality of faces, thereby deciding the face corresponding to each tag code in the game of this run. In addition, the processor 410 stores the generated corresponding relationships in the storage device 420. During the process of the game, the processor 410, after identifying recognition codes of gaming devices, obtains a corresponding relationship between the tag codes and the faces from the storage device 420 according to the tag codes generated corresponding to the recognition codes. Meanwhile, the processor 410 decides the faces corresponding to the tag codes according to the corresponding relationship. These faces have respectively corresponding game screens in different games, and the processor 410 transmits the game screens to the gaming devices via the communication device for being displayed by the display panels of the gaming devices (e.g., the mahjong screen displayed in the display panel 120 as illustrated in FIG. 2).

With the gaming device and the gaming device recognition method provided by the invention, during the process of the on-line game, the user can play the game together with users at remote ends or virtual characters through physical game cards at a local end. Moreover, the number of the gaming device as needed is less than that of the gaming device as needed in an actual game. Taking the mahjong game for example, a general off-line mahjong game requires 144 mahjong tiles. However, with the gaming device and the gaming device recognition method provided by the invention, when playing the mahjong game with users at remote ends or virtual characters, the user at the local end requires only 44 game cards to simulate the mahjong tiles that are touched or will be touched by the user at the local end. The mahjong tiles that are touched or will be touched include the mahjong tiles at hand, the played mahjong tiles and the mahjong tiles on the table that are to be taken. Among them, the mahjong tiles to be taken may be vertical or horizontal. Accordingly, the gaming device and the gaming device recognition method provided by the embodiments of the invention can allow the user to enjoy the same game experience as that in the actual game with less game cards.

In light of the foregoing, the gaming device and the gaming device recognition method provided by the embodiments of the invention, allowing the user to paly single- or multi-player poker, mahjong or other card games in a stand-alone computer or computers in connection, can provide convenience and entertainment. Accordingly, the invention can bring the users with good experience.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A gaming device recognition method, applicable to an electronic device having an image capturing device, a storage device and a processor, the gaming device recognition method comprising:

capturing at least one captured image of a gaming device by the image capturing device, wherein the gaming device comprises a recognition code having a plurality of anchor grids and at least one recognition grid;

generating a first image by performing image processing on the at least one captured image;

recognizing the anchor grids in the first image;

deciding a recognition template according to the anchor grids, wherein the recognition template comprises at least one code grid and at least one grid number corresponding to the at least one code grid; and determining at least one filled status of the at least one code grid according to the first image and generating a tag code corresponding to the recognition code according to the at least one filled status and the at least one grid number.

2. The gaming device recognition method according to claim 1, wherein the electronic device further comprises a recognition region, and the method further comprises:

capturing the at least one captured image of the gaming device located in the recognition region by the image capturing device.

3. The gaming device recognition method according to claim 1, wherein the step of generating the first image by performing the image processing on the at least one captured image comprises:

performing the image processing on the at least one captured image, and calculating a probability of pixel dots having same coordinates existing in the at least one captured image on which the image processing has been performed to decide the first image.

4. The gaming device recognition method according to claim 1, wherein the image processing comprises image sharpening, image binarization and/or dilation of morphological operation.

5. The gaming device recognition method according to claim 1, wherein the step of recognizing the anchor grids in the first image comprises:

detecting a plurality of first contour coordinate points in the first image;

obtaining a plurality of virtual objects according to the first contour coordinate points by using a polygonal approximation method, wherein the virtual objects comprise a first virtual object;

generating a first rectangular object corresponding to the first virtual object according to a plurality of second contour coordinate points corresponding to the first virtual object; and determining whether the first virtual object belongs to the anchor grids according to an area of the first rectangular object.

6. The gaming device recognition method according to claim 5, wherein the step of determining whether the first virtual object belongs to the anchor grids according to the area of the first rectangular object comprises:

if an area of the rectangular object is smaller than a first threshold value, determining that the first virtual object belongs to the anchor grids.

7. The gaming device recognition method according to claim 1, wherein the step of deciding the recognition template according to the anchor grids comprises:

deciding a direction of the recognition template according to the anchor grids.

8. The gaming device recognition method according to claim 1, wherein the step of determining the at least one filled status according to the first image comprises:

determining whether the first image has a plurality of third contour coordinate points at a same coordinate position corresponding to the at least one code grid, determining the at least one code grid being presented in a filled status if the first image has the third contour coordinate points, and determining the at least one code grid being presented in an unfilled status if the first image does not have the third contour coordinate points.

9. The gaming device recognition method according to claim 8, wherein the step of generating the tag code corresponding to the recognition code according to the at least one filled status and the at least one grid number comprises:

calculating the tag code according to the at least one filled status of the at least one code grid by using a binary system, wherein when the at least one code grid is presented in the filled status, the at least one code grid corresponds to the bit 1 of the binary system, and when the at least one code grid is presented in the unfilled status, the at least one code grid corresponds to the bit 0 of the binary system.

10. The gaming device recognition method according to claim 9, wherein the tag code is generated by sorting bits corresponding to the at least one code grid according to an order of the at least one grid number corresponding to the at least one code grid.

11. The gaming device recognition method according to claim 9, wherein the method further comprises:

converting the tag code into a decimal value.

12. The gaming device recognition method according to claim 1, wherein the method further comprises:

determining a face of a card game that the tag code corresponds to, wherein the face corresponds to a game screen; and transmitting the game screen corresponding to the face to the gaming device.

13. A gaming device, applicable to a card game, comprising:

a recognition code, having a plurality of anchor grids and at least one recognition grid, wherein the recognition code corresponds to a tag code, and the tag code corresponds to a face of the card game; and a display panel, configured to display a game screen corresponding to the face, wherein the display panel corresponds to a first region of a surface of the gaming device, the recognition code corresponds to a second region of the surface, and the first region and the second region does not overlap with each other.

14. The gaming device according to claim 13, wherein the recognition code corresponds to a recognition template, wherein the recognition template comprises at least one code grid and at least one grid number corresponding to the at least one code grid, and the at least one code grid corresponds to the at least one recognition grid.

15. The gaming device according to claim 14, wherein the recognition template comprises 6 code grids, each of the code grids corresponding to 1 or 0 of a binary system, and the recognition template is capable of generating the recognition code in 64 combinations.

16. The gaming device according to claim 13, wherein the recognition code is invisible under visible light.

17. A gaming device recognition method, applicable to an electronic device having an image capturing device, a storage device and a processor, the gaming device recognition method comprising:

capturing a plurality of first infrared images of a gaming device by the image capturing device;

generating a first image by performing image processing on the first infrared images;

detecting and determining whether a plurality of anchor grids exist in the first image; and if the anchor grids exist, detecting and defining positions of a plurality of code grids in the first image.

18. The gaming device recognition method according to claim 17, wherein the step of generating the first image by perfoi ming the image processing on the first infrared images comprises:

obtaining a plurality of second infrared images by performing image sharpening, image binarization and dilation of morphological operation on the first infrared images; and obtaining a plurality of first ROI images by extracting the second infrared images.

19. The gaming device recognition method according to claim 18, wherein the step of generating the first image by performing the image processing on the first infrared images comprises:

accumulating the first ROI images to reach a predetermined number;

obtaining a second ROI image by superimposing the predetermined number of the first ROI images and dividing it by a sampling number; and generating the first image by performing the image binarization on the second ROI image.

20. The gaming device recognition method according to claim 19, wherein the sampling number is less than the predetermined number, and the sampling number is greater than ½ of the predetermined number.

21. The gaming device recognition method according to claim 17, wherein the step of detecting and determining whether the anchor grids exist in the first image comprises:

determining and confirming that number of the anchor grids is three; and defining the three anchor grids as a first anchor grid, a second anchor grid and a third anchor grid.

22. The gaming device recognition method according to claim 21, wherein the step of defining the three anchor grids as the first anchor grid, the second anchor grid and the third anchor grid comprises:

detecting a plurality of first contour coordinate points in the first image;

obtaining a plurality of filtered first contour coordinate points by filtering the first contour coordinate points by using a polygonal approximation method;

obtaining a plurality of virtual objects by defining the filtered first contour coordinate points that are near to each other as a same virtual object; and generating a plurality of second contour coordinate points corresponding to the virtual objects.

23. The gaming device recognition method according to claim 22, wherein the second contour coordinate points comprise one having a maximum horizontal coordinate value and a maximum vertical coordinate value and another one having a minimum horizontal coordinate value and a minimum vertical coordinate value.

24. The gaming device recognition method according to claim 23, wherein the step of defining the three anchor grids as the first anchor grid, the second anchor grid and the third anchor grid comprises:

defining the second contour coordinate points as respectively corresponding to a plurality of rectangular objects;

calculating center points corresponding to the rectangular objects according to the second contour coordinate points to respectively represent the virtual objects; and calculating an area of each of the rectangular objects, determining that the rectangular object or the virtual object corresponding to the rectangular object belongs to the anchor grids if an area of the rectangular object is smaller than a threshold value.

25. The gaming device recognition method according to claim 24, wherein the step of defining the three anchor grids as the first anchor grid, the second anchor grid and the third anchor grid comprises:

calculating inner products according to the center points of the anchor grids and obtaining a plurality of included angles;

defining the anchor grid corresponding to a minimum included angle as the first anchor grid;

defining the anchor grid corresponding to a maximum included angle as the second anchor grid;

defining the anchor grid corresponding to an intermediate included angle as the third anchor grid; and defining a triangular pattern according to the three anchor grids which are the first anchor grid, the second anchor grid and the third anchor grid.

26. The gaming device recognition method according to claim 25, wherein the maximum included angle is an included angle of 90 degrees.

27. The gaming device recognition method according to claim 26, wherein the step of defining the three anchor grids as the first anchor grid, the second anchor grid and the third anchor grid comprises:

generating a recognition template.

28. The gaming device recognition method according to claim 27, wherein the step of generating the recognition template comprises:

determining whether the triangular pattern is vertical or horizontal;

if the triangular pattern is vertical, further determining whether the triangular pattern is needed to be rotated;

if the vertical triangular pattern is not needed to be rotated, generating the vertical recognition template directly according to the triangular pattern;

if the vertical triangular pattern is needed to be rotated, rotating the triangular pattern by 180 degrees and then accordingly generating the vertical recognition template;

if the triangular pattern is horizontal, further determining whether the triangular pattern is needed to be rotated;

if the horizontal triangular pattern is not needed to be rotated, generating the horizontal recognition template directly according to the triangular pattern; and if the horizontal triangular pattern is needed to be rotated, rotating the triangular pattern by 180 degrees and then accordingly generating the horizontal recognition template.

29. The gaming device recognition method according to claim 27, wherein the recognition template comprises code grids configured among the first anchor grid, the second anchor grid and the third anchor grid.

30. The gaming device recognition method according to claim 29, comprising:

defining positions of the code grids.

31. The gaming device recognition method according to claim 30, comprising:
   generating a plurality of serial numbers according to the first anchor grid, the second anchor grid and the third anchor grid; and
   corresponding the serial numbers to the code grids.

32. The gaming device recognition method according to claim 27, comprising:
   reading a preset model; and
   corresponding the code grids and the positions of the code grids to the preset model.

33. The gaming device recognition method according to claim 17, comprising:
   determining filled statuses of the code grids;
   converting the filled status of each of the code grids into a binary code;
   converting the binary code into a decimal code; and
   generating a tag code according to the decimal code.

34. The gaming device recognition method according to claim 33, comprising:
   determining a face corresponding to the tag code, and the face corresponding to a game screen; and
   transmitting the game screen to the gaming device.

\* \* \* \* \*